(12) United States Patent
Cho et al.

(10) Patent No.: US 9,828,295 B2
(45) Date of Patent: Nov. 28, 2017

(54) MESOPOROUS SILICA/CERIA-SILICA COMPOSITE AND METHOD FOR PREPARING SAME

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Eun-Bum Cho, Seoul (KR); Seung-Hyuk Yim, Gangwon-do (KR)

(73) Assignee: FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/102,261

(22) PCT Filed: Aug. 12, 2014

(86) PCT No.: PCT/KR2014/007496
§ 371 (c)(1),
(2) Date: Jun. 6, 2016

(87) PCT Pub. No.: WO2015/119345
PCT Pub. Date: Aug. 13, 2015

(65) Prior Publication Data
US 2016/0318804 A1    Nov. 3, 2016

(30) Foreign Application Priority Data
Feb. 10, 2014 (KR) .................. 10-2014-0014720

(51) Int. Cl.
| C04B 35/14 | (2006.01) |
| C01B 33/12 | (2006.01) |
| C04B 35/632 | (2006.01) |
| C04B 35/64 | (2006.01) |
| C04B 35/626 | (2006.01) |

(52) U.S. Cl.
CPC .............. *C04B 35/14* (2013.01); *C01B 33/12* (2013.01); *C04B 35/6265* (2013.01);
(Continued)

(58) Field of Classification Search
CPC ....... C04B 35/14; C04B 35/632; C04B 35/64; C01B 33/12
See application file for complete search history.

(56) References Cited

U.S. PATENT DOCUMENTS

2005/0112389 A1    5/2005  Loureiro et al.

FOREIGN PATENT DOCUMENTS

| KR | 10-2010-0029434 | 3/2010 |
| KR | 10-2012-0054418 | 5/2012 |
| KR | 10-2012-0125999 | 11/2012 |

OTHER PUBLICATIONS

Dunne et al. Hierarchically Structured Ceria-Silica: Synthesis and Thermal Properties. J. Phys. Chem. C 2012, 116, 13435-13445.*
Strunk et al. Synthesis of Different CeO2 Structures on Mesoporous Silica and Characterization of Their Reduction Properties. J. Phys. Chem. C 2011, 115, 4114-4126.*

(Continued)

*Primary Examiner* — Noah Wiese
(74) *Attorney, Agent, or Firm* — Lewis Roca Rothgerber Christie LLP

(57) ABSTRACT

The present invention relates to a mesoporous silica/ceria-silica composite and a method for preparing a mesoporous composite and, more specifically, to a mesoporous silica/ceria-silica composite which is composed of mesoporous silica having a hexagonal or cubic structure and ceria having a hexagonal structure provided on a surface and pores of the mesoporous silica, the oxidation state of the ceria being $Ce^{4+}$ and $Ce^{3+}$.

14 Claims, 13 Drawing Sheets

(52) U.S. Cl.
CPC .. *C04B 35/62635* (2013.01); *C04B 35/62675* (2013.01); *C04B 35/632* (2013.01); *C04B 35/64* (2013.01); *C01P 2006/12* (2013.01); *C01P 2006/16* (2013.01); *C04B 2235/3229* (2013.01); *C04B 2235/3418* (2013.01); *C04B 2235/44* (2013.01); *C04B 2235/441* (2013.01); *C04B 2235/443* (2013.01); *C04B 2235/448* (2013.01); *C04B 2235/5409* (2013.01); *C04B 2235/66* (2013.01); *C04B 2235/762* (2013.01); *C04B 2235/767* (2013.01)

(56) References Cited

OTHER PUBLICATIONS

International Search Report, corresponding to PCT/KR2014/007496, dated Nov. 19, 2014, 4 pages.
Liotta, et al., "Mesoporous SBA-15 silica modified with cerium oxide: Effect of ceria loading on support modification", Studies in Surface Science and Catalysis, 2010, vol. 175, pp. 401-404.
Strunk, et al., "Synthesis of Different $CeO_2$ Structures on Mesoporous Silica and Characterization of Their Reduction Properties", The Journal of Physical Chemistry, Feb. 22, 2011, vol. 115, pp. 4114-4126.
Liu, et al., "Enhancement of Activity and Sulfur Resistance of $CeO_2$ Supported on $TiO_2$—$SiO_2$ for the Selective Catalytic Reduction of NO by $NH_3$", Environ. Sci. Technol. 2012, 46, 6182-6189.
Li, et al., "Direct synthesis of $CeO_2/SiO_2$ mesostructured composite materials via sol-gel process", Microporous and Mesoporous Materials 120 (2009) 421-425.

\* cited by examiner

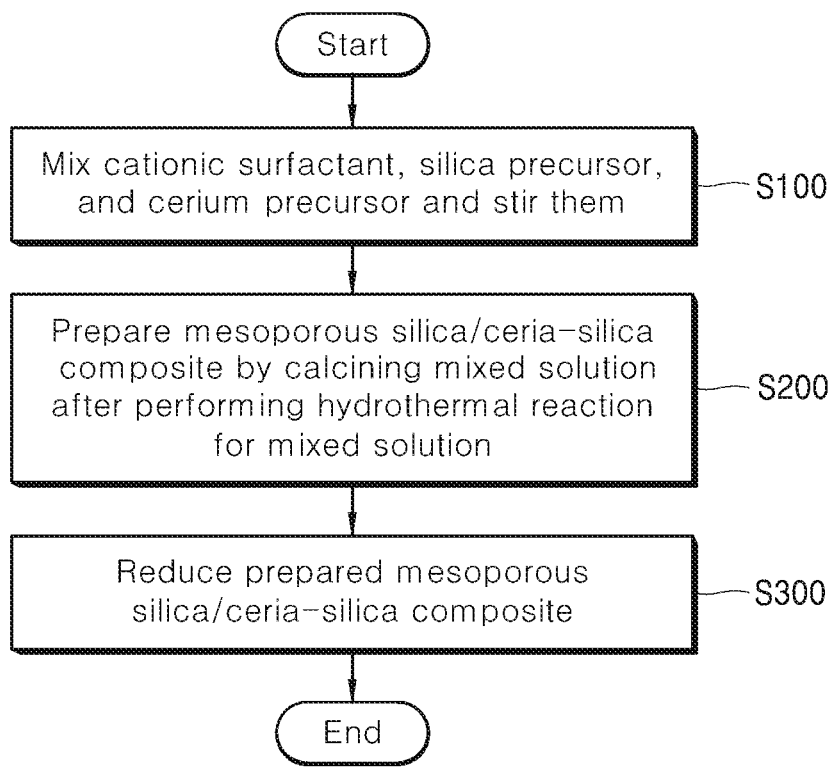
[FIG. 1]

[FIG. 2]
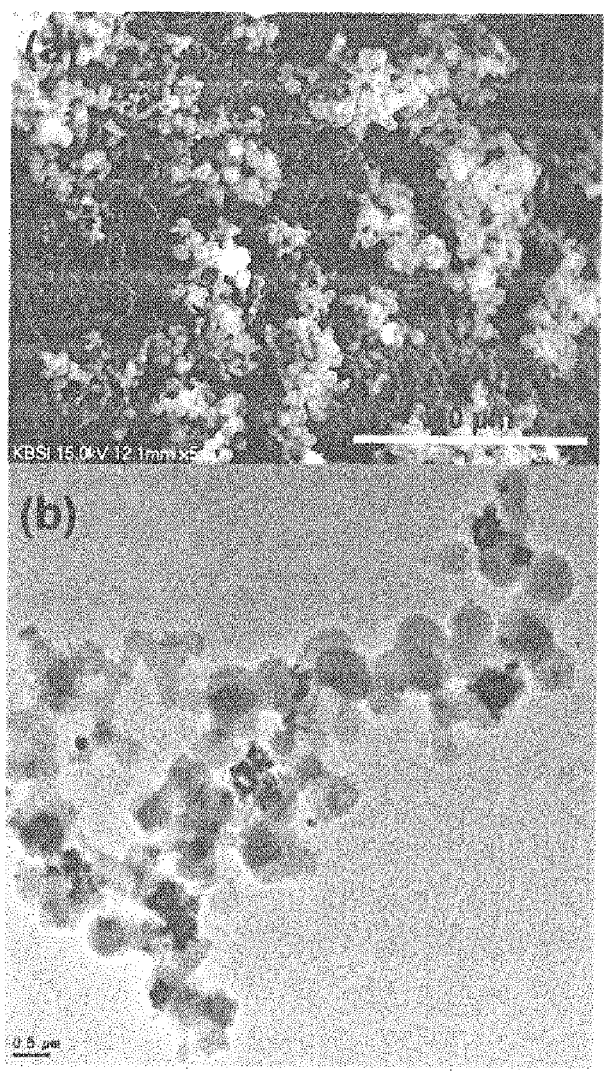

[FIG. 3]
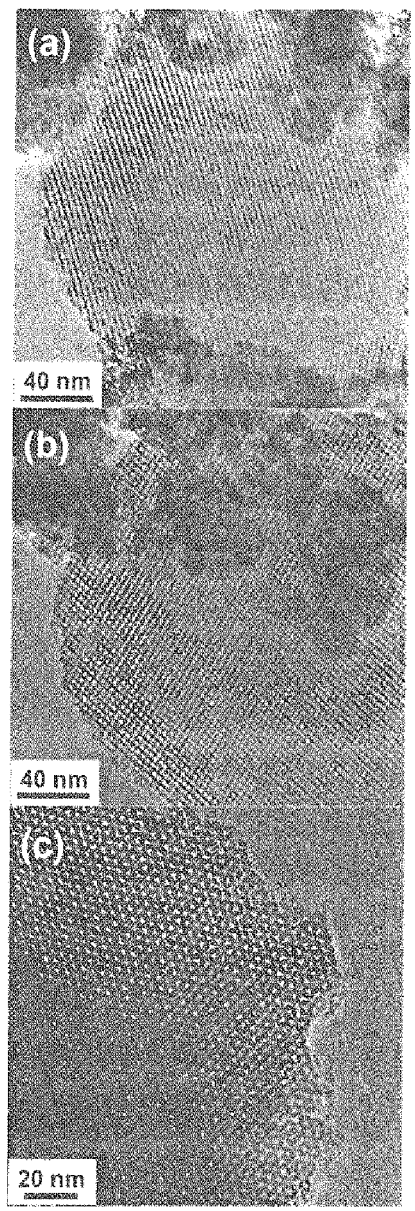

[FIG. 4]
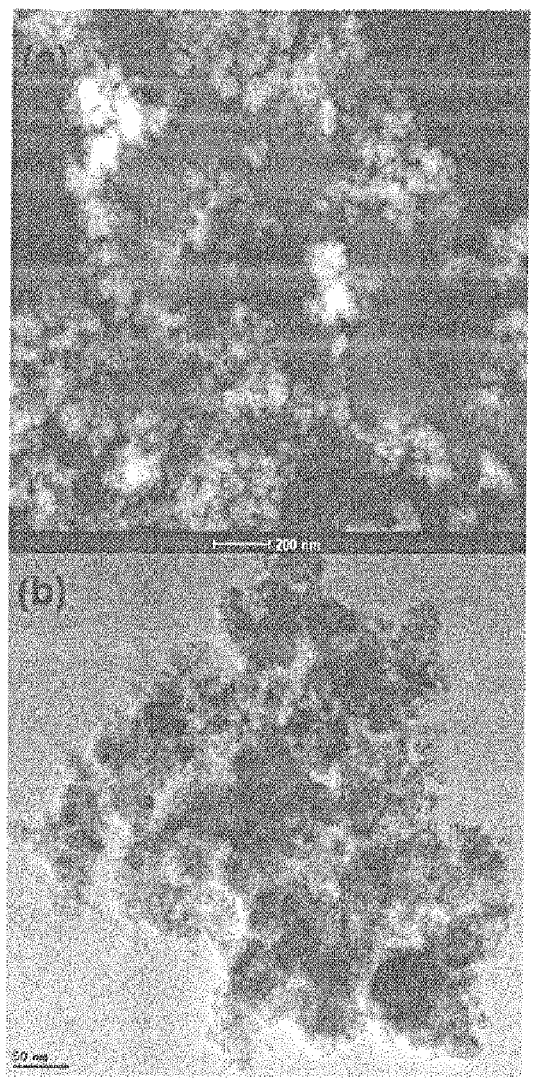

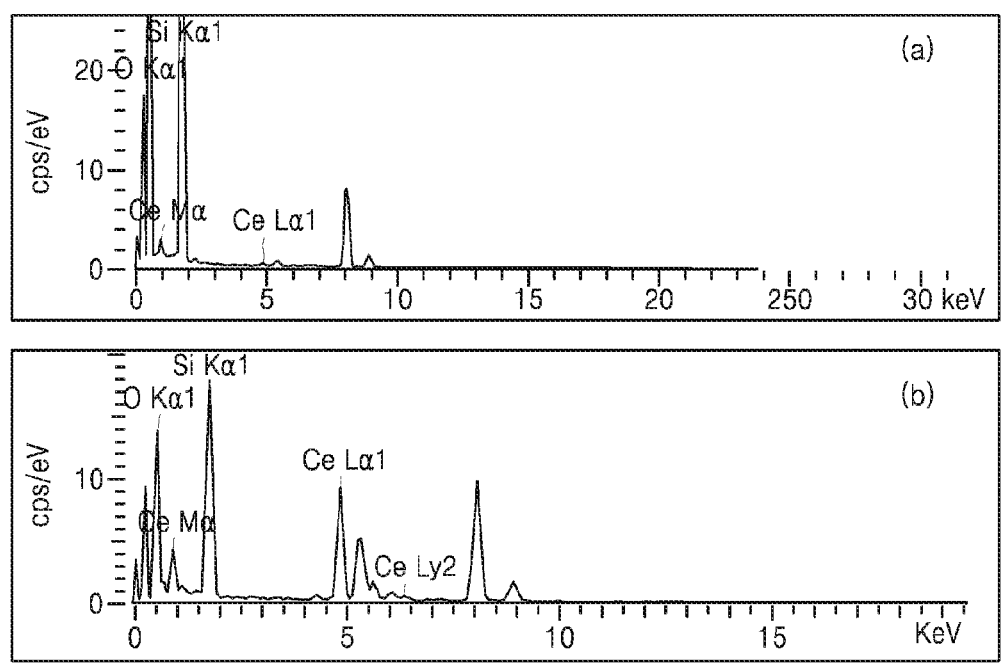
[FIG. 5]

[FIG. 6]
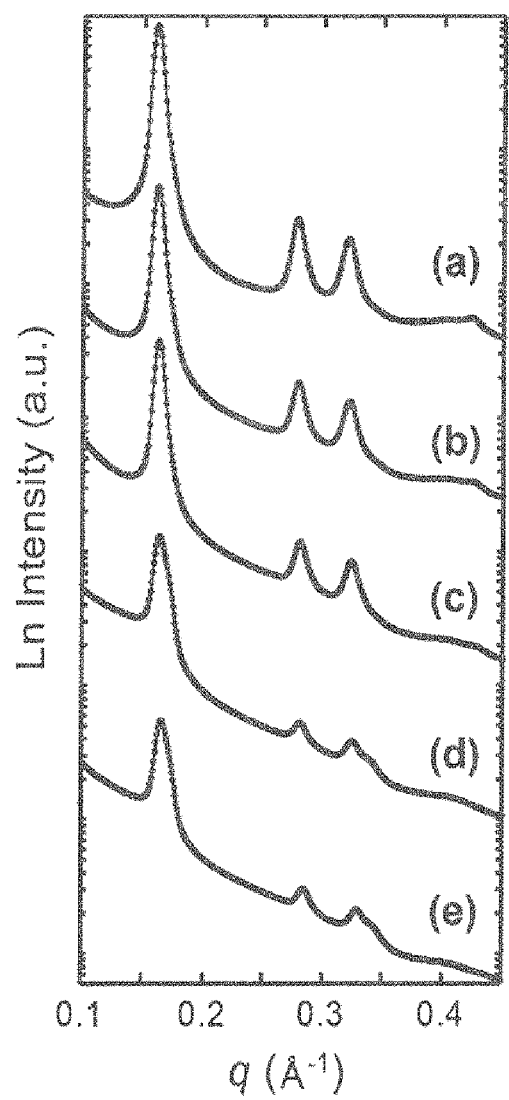

[FIG. 7]
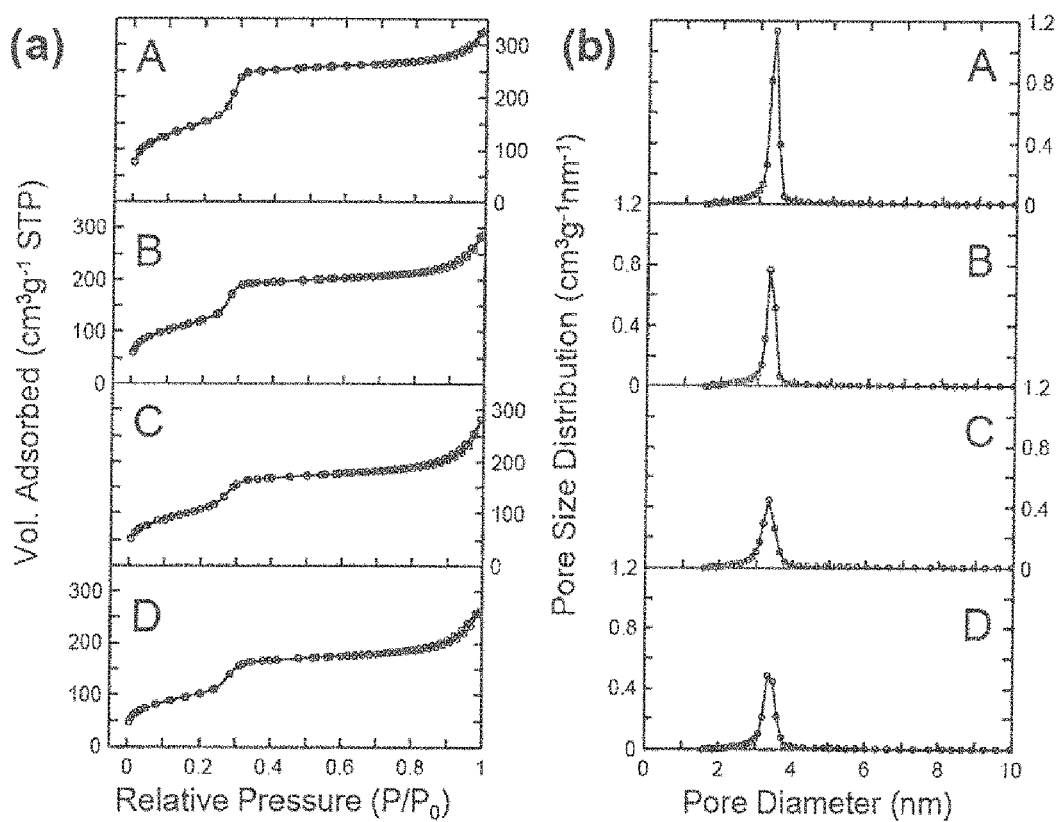

[FIG. 8]
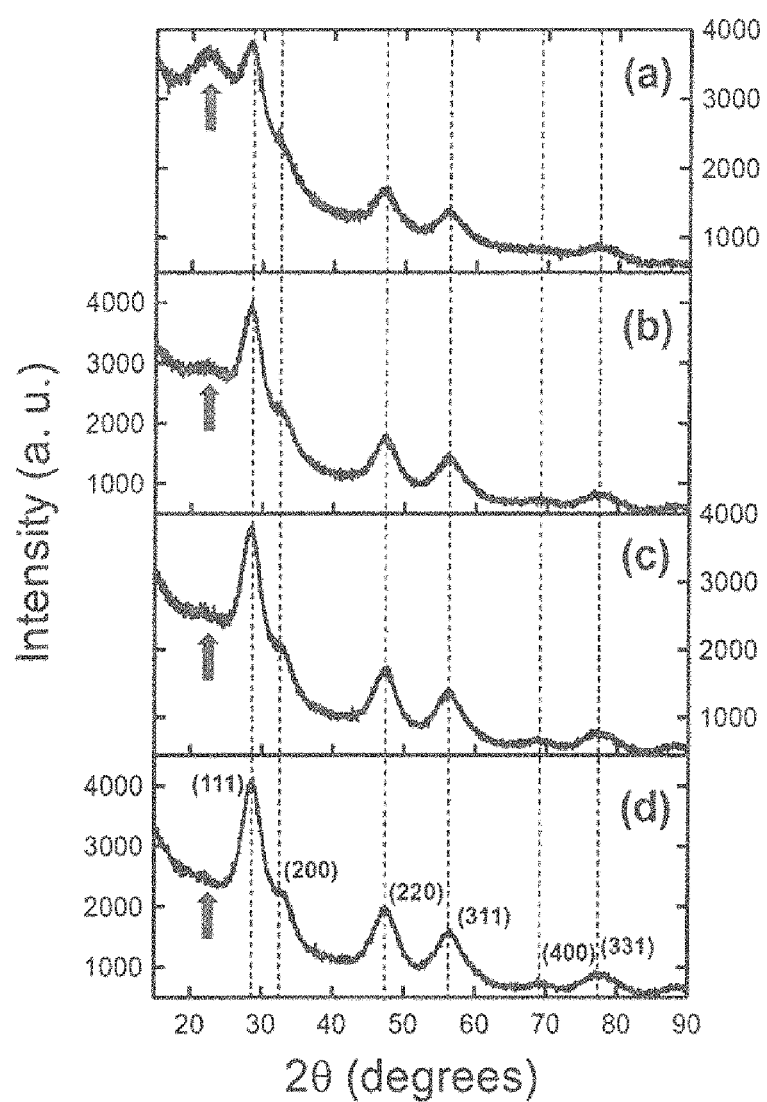

[FIG. 9]
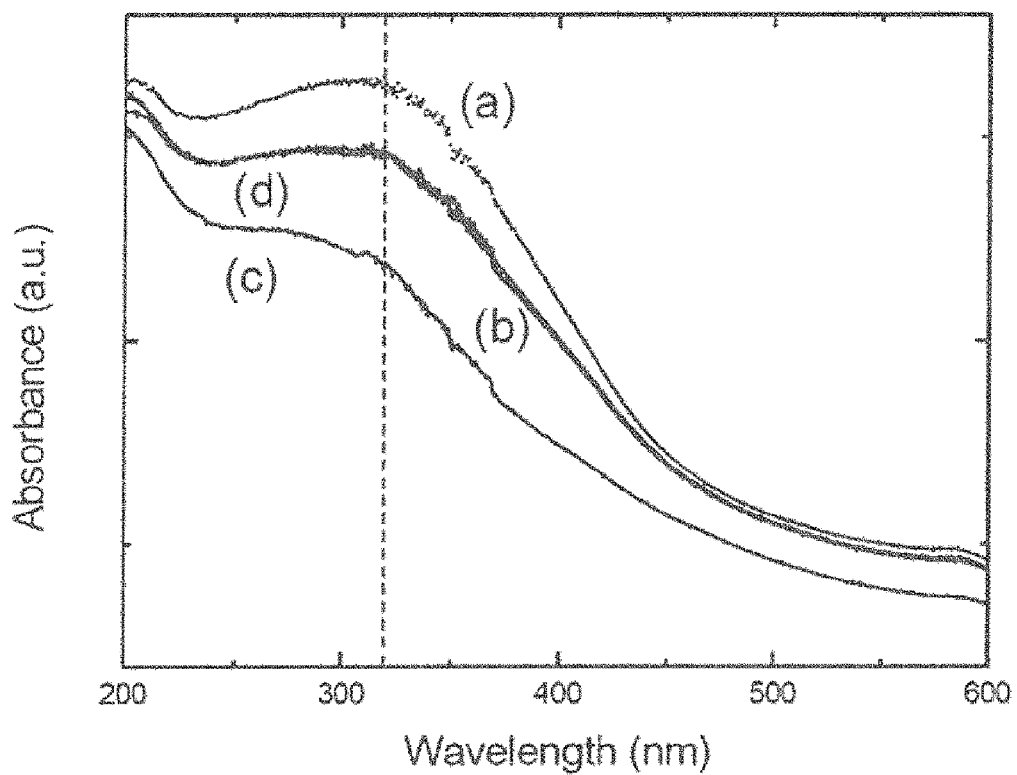

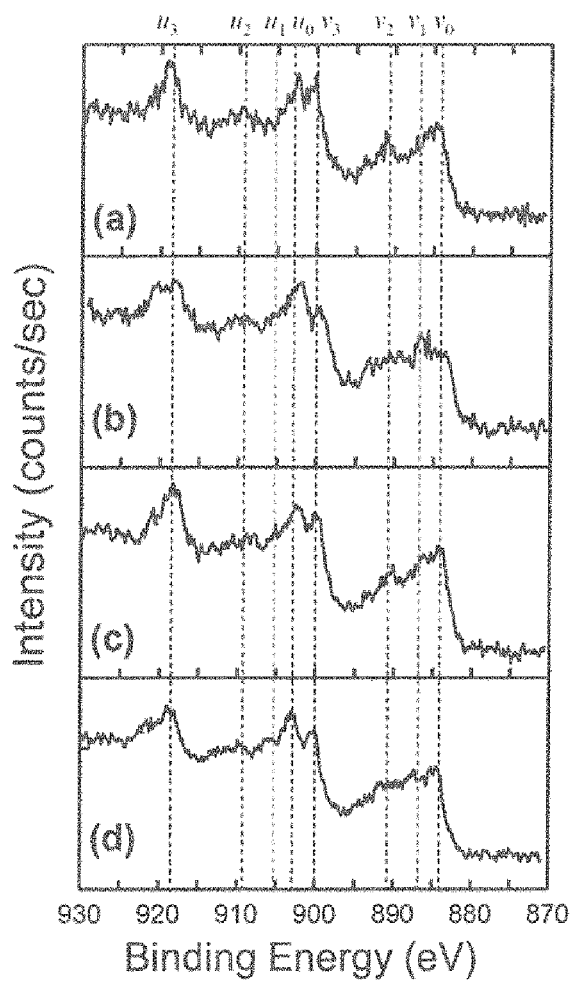
[FIG. 10]

[FIG. 11]
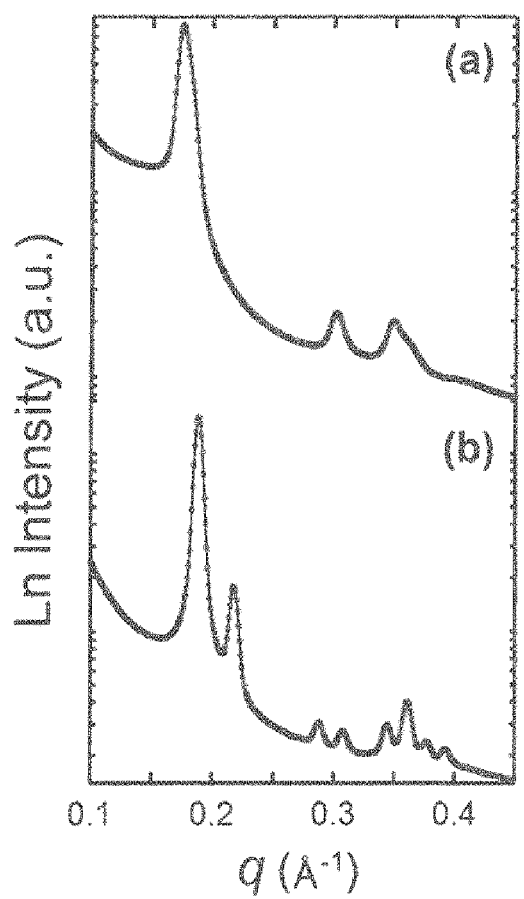

[FIG. 12]
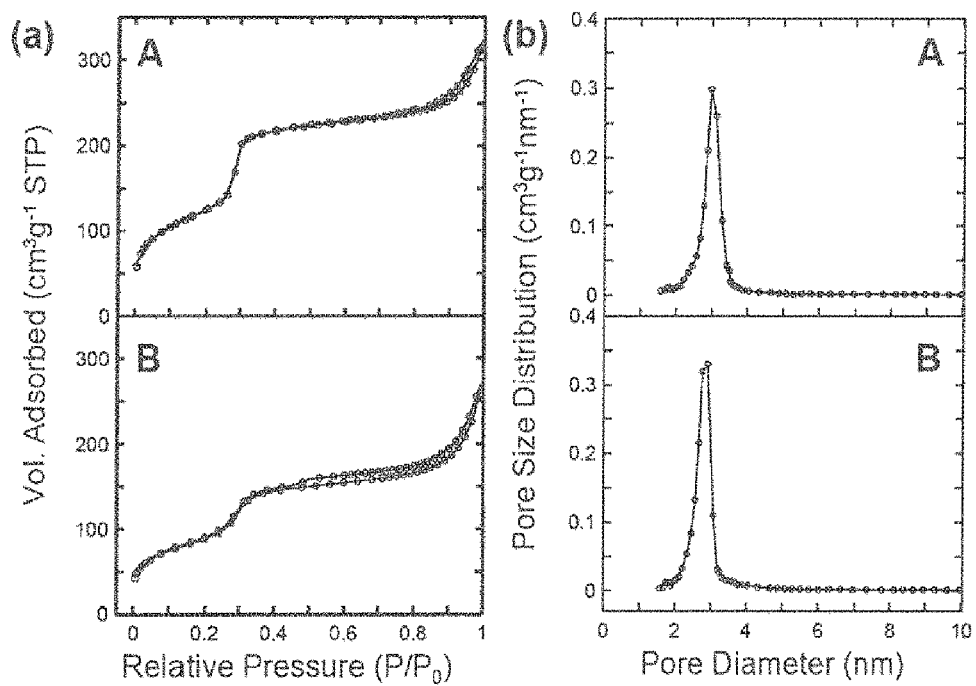

[FIG. 13]
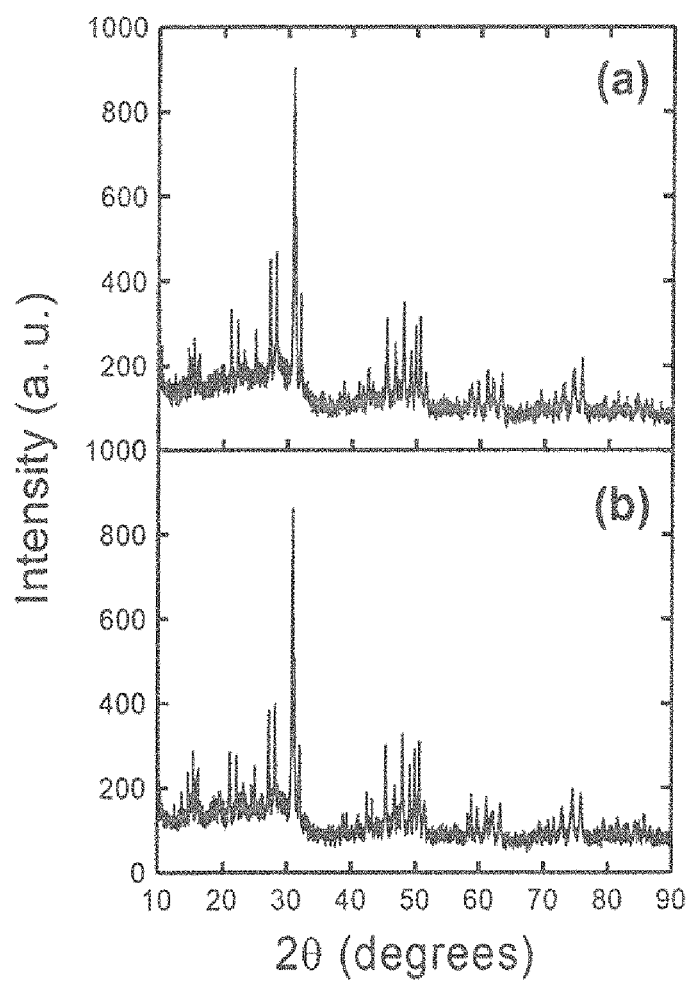

MESOPOROUS SILICA/CERIA-SILICA COMPOSITE AND METHOD FOR PREPARING SAME

CROSS-REFERENCED TO RELATED APPLICATION(S)

This Application is a National Phase Patent Application and claims priority to and the benefit of International Application Number PCT/KR2014/007496, filed on Aug. 12, 2014, which claims priority to and the benefit of Korean Application 10-2014-0014720, filed Feb. 10, 2014, the entire contents of all of which are incorporated herein by reference.

TECHNICAL FIELD

The present invention relates to a mesoporous silica/ceria-silica composite and a method of preparing the mesoporous silica/ceria-silica composite.

BACKGROUND ART

A cerium oxide (ceria) is a semiconductor generally known as an important material due to a catalytic property and having a wide band gap. Ceria has been extensively used as a catalyst, for example, for fluid cracking, harmful gas purification, a solid oxide fuel cell, an antioxidant in biological medicine, or an abrasive for chemical mechanical planarization (CMP) process in a micro-electronics industry. In addition, as generally known to in the art, the performance of the ceria is closely related to the shape and the structural arrangement of a ceria crystal. When ceria has the shape of a thin film, the ceria has a high refractive index, a high dielectric constant, and a lattice constant similar to that of Si. Accordingly, the ceria may be employed in technologies related to Si, such as micro-electronics and optics. The nano-size ceria represents improved activity because of an increased surface area, a surface superoxide, and the easier formation of an air gap between oxygen atoms.

Recently, ceria nano-particles have significantly attracted attention as an agent to prevent cells from being aged. Brain cell cultures containing ceria nano-particles are improved in lifespan. The mechanism connected with the lifespan is associated with free radical scavenging from cells so that the damage to the cells may be eliminated or reduced. According to the effect of the free radical scavenging, $Ce^{3+}$ reduces free radicals, and is oxidized to $Ce^{4+}$. Since the ceria nano-particles having high reactivity may be applied to various fields, there have been reported various manners, such as sol-gel and solvothermal routes, sonochemical, coordination chemistry, and pyrolysis methods, that prepare ceria nano-particles.

However, pure ceria nano-particles have low thermal stability under an oxidation condition and a sintering atmosphere, which affects the performance of the ceria nano-particles. Accordingly, there are required studies and researches on structures of maximizing advantages of a support and ceria nano-particles by combining the ceria nano-particles and a support materials to maintain the large surface area and the high activity of the ceria nano-particles even under high temperature and inferior environments.

As the related art, there is disclosed Korean Unexamined Patent Publication No. 10-2012-0125999 (published on Nov. 20, 2012) entitled "Method of Preparing Silica-Ceria, Core-Shell Nano-Particles Using Microemulsion".

DISCLOSURE

Technical Problem

An object of the present invention is to provide a mesoporous silica/ceria-silica composite having a stable structure as ceria is combined with silica, which serves as a support, and representing improved reactivity, and a method of preparing the same.

The objects of the present invention are not limited to the above-mentioned object(s), and other objects (another object) will be clearly understood from the following description by those skilled in the art unless otherwise indicated.

Technical Solution

In order to accomplish the object of the present invention, there is provided a mesoporous silica/ceria-silica composite including a mesoporous silica having a hexagonal structure or a cubic structure and a ceria having the hexagonal structure and provided on a surface and in a pore of the mesoporous silica, in which oxidation states of the ceria are $Ce^{4+}$ and $Ce^{3+}$.

In this case, a mole ratio of Ce of the ceria to Si of the silica is in the range of 0.001 to 0.5.

In the oxidation states of the ceria, the $Ce^{3+}$ has a content of 10.2 mole % to 23.8 mole % based on a total cerium, and the $Ce^{4+}$ has a content of 76.2 mole % to 89.8 mole % based on the total cerium.

The mesoporous silica has a pore volume of 0.20 $cm^3/g$ to 0.40 $cm^3/g$, and the BET specific surface area of 250 $m^2/g$ to 600 $m^2/g$.

Further, there is provided a method of preparing a mesoporous silica/ceria-silica composite, including mixing a cationic surfactant, a silica precursor, and a cerium precursor and stirring them, preparing the mesoporous silica/ceria-silica composite by calcining a mixed solution after performing a hydrothermal reaction for the mixed solution, and reducing the prepared mesoporous silica/ceria-silica composite.

The cationic surfactant, which severs as a cationic surfactant ($CH_3(CH_2)_nN^+(CH_3)_3$) including hydrophobic alkyl chain and hydrophilic amine, may include hexadecyl trimethyl ammonium bromide (CTAB) or hexadecyl trimethyl ammonium chloride (CTACl). The silica precursor may include tetraethyl orthosilicate (TEOS) or tetramethyl orthosilicate (TMOS), and the cerium precursor may include one selected from the group consisting of cerium hydroxide ($Ce(OH)_4$), cerium nitrate ($Ce(NO_3)_3$), and cerium sulfate ($Ce_2(SO_4)_3$, $Ce(SO_4)_2$).

A mole ratio of the cerium precursor to the silica precursor is in the range of 0.001 to 0.5.

The stirring is performed at a rate of 200 rpm to 600 rpm for 30 min. to 1440 min.

The hydrothermal reaction is performed at a temperature of 80° C. to 120° C. for 20 hours to 48 hours.

The calcining is performed under air at a temperature of 500° C. to 600° C. for 4 hours to 6 hours.

The reducing is performed at a temperature of 850° C. to 900° C. for 3 hours to 6 hours.

Advantageous Effects

As described above, according to the present invention, the mesoporous silica/ceria-silica composite can be prepared in which a mesoporous silica template serving as a structure, which is a frame, has a low cerium content, and a pore formed in the silica template has the high content of cerium ($Ce^{4+}$), and used as a radical inhibitor representing an excellent radical scavenging effect as the oxidation state of the cerium becomes $Ce^{3+}$ by performing a reduction process.

In addition, the mesoporous silica/ceria-silica composite according to the present invention can represent excellent biocompatibility as the silica is used as the template, so that the composite can be used even in a drug delivery system. In addition, the composite has an excellent absorbability with a reactant to be chemically stabilized. Further, since the composite has an improved reactivity with a target material, the composite can be used in various fields such as fuel cells, ion exchange materials, catalysts, and biomaterials.

DESCRIPTION OF DRAWINGS

FIG. 1 is a flowchart showing a method of preparing a mesoporous silica/ceria-silica composite according to the present invention.

FIG. 2 illustrates FE-SEM photographs of the mesoporous silica/ceria-silica composite according to the present invention.

FIG. 3 illustrates high-magnification TEM photographs to analyze the nano-structure particles of the mesoporous silica/ceria-silica composite according to the present invention and the size thereof.

FIG. 4 illustrates TEM photographs showing the mesoporous silica/ceria-silica composite powders according to the present invention.

FIG. 5 illustrates graphs showing the analysis results by a TEM EDX in order to examine the chemical composites of mutually different particles.

FIG. 6 is a graph showing the analysis result of the nano-structure of the mesoporous silica/ceria-silica composite according to the present invention by small angle X-ray scattering (SAXS).

FIG. 7 illustrates graphs showing a nitrogen adsorption-desorption isothermal curve of the hexagonal mesoporous silica/ceria-silica composite according to the present invention, and the pore size distribution of the composite, respectively.

FIG. 8 illustrates graphs showing X-ray diffraction patterns of the hexagonal mesoporous silica/ceria-silica composite according to the present invention.

FIG. 9 is a graph showing scattering and reflection ultraviolet-visible absorbance spectra of the hexagonal mesoporous silica/ceria-silica composite according to the present invention.

FIG. 10 illustrates graphs showing X-ray photoelectron (XPS) measurement results of the hexagonal mesoporous silica/ceria-silica composite according to the present invention.

FIG. 11 is a graph showing an SAXS spectrum of a reduced silica/ceria-silica composite according to the present invention.

FIG. 12 illustrates graphs showing nitrogen adsorption-desorption isothermal curves of the reduced hexagonal and cubic silica/ceria-silica composites according to the present invention, and the pore size distribution of the composite, respectively.

FIG. 13 illustrates graphs showing wide angle X-ray diffraction patterns of the reduced hexagonal and cubic mesoporous silica/ceria-silica composites according to the present invention.

BEST MODE

Hereinafter, an exemplary embodiment of the present invention will be described in detail with reference to accompanying drawings.

The advantages, the features, and schemes of achieving the advantages and features of the disclosure will be apparently comprehended by those skilled in the art based on the embodiments, which are detailed later in detail, together with accompanying drawings.

However, the present invention is not limited to embodiments disclosed hereinafter, but realized in various forms. The present embodiments are provided to make the disclosure of the present invention perfect and to let those skilled in the art completely comprehend the scope of the present invention, and defined within the scope of accompanying claims of the present invention.

Further, in the following description, the details of the generally-known technology that makes the subject matter of the present invention unclear will be omitted in the following description.

The present invention provides a mesoporous silica/ceria-silica composite including a mesoporous silica having a hexagonal structure or a cubic structure and a ceria having the hexagonal structure and provided on a surface and in a pore of the mesoporous silica, wherein oxidation states of the ceria are $Ce^{4+}$ and $Ce^{3+}$.

According to the mesoporous silica/ceria-silica composite of the present invention, a plurality of pores exist in a hexagonal or cubic silica template, and ceria is bonded to the surface and the inside of the pores of the template. The ceria is formed in the hexagonal and cubic structures, and the oxidation states of the ceria become $Ce^{4+}$ and $Ce^{3-}$. Most parts of $Ce^{4-}$ may be changed to $Ce^{3+}$ through the reduction process thereafter.

The mesoporous silica/ceria-silica composite according to the present invention has improved strength and biocompatibility due to a silica template having a plurality of mesoporous. In addition, ceria is bonded to the surface and the inside of the pores of the silica template to prevent the ceria from being agglomerated to be enlarged and aged. In addition, the composite has $Ce^{3+}$ representing a great radical scavenging effect.

In the mesoporous silica/ceria-silica composite, a mole ratio of Ce of the ceria to Si of the silica is in the range of 0.001 to 0.5. In the oxidation states of the ceria, the $Ce^{3+}$ has a content of 10.2 mole % to 23.8 mole % based on a total cerium, and the $Ce^{4+}$ has a content of 76.2 mole % to 89.8 mole % based on the total cerium. Further, in the mesoporous silica/ceria-silica composite according to the present invention, the mesoporous silica has a pore volume of 0.20 $cm^3/g$ to 0.40 $cm^3/g$, and the BET specific surface area of 250 $m^2/g$ to 600 $m^2/g$.

Further, the present invention provides a method of preparing a mesoporous silica/ceria-silica composite, including mixing and stirring a cationic surfactant, a silica precursor, and a cerium precursor, preparing the mesoporous silica/ceria-silica composite by calcining a mixed solution after performing a hydrothermal reaction for the mixed solution, and reducing the prepared mesoporous silica/ceria-silica composite.

FIG. 1 is a flowchart showing a method of preparing a mesoporous silica/ceria-silica composite according to the present invention. Hereinafter, the method of preparing the mesoporous silica/ceria-silica composite will be described in detail with reference to FIG. 1.

The method of preparing the mesoporous silica/ceria-silica composite according to the present invention includes a step of mixing and stirring a cationic surfactant, a cerium precursor and a silica precursor (S100).

In this case, the cationic surfactant, the cerium precursor and the silica precursor may be dissolved in de-ionized water, ammonium hydroxide ($NH_4OH$), and ethanol. In detail, preferably, after dissolving the cationic surfactant into the de-ionized water, the ammonium hydroxide, and the ethanol and stirring the result, the silica precursor is added and stirred, and a ceria precursor is added and stirred. This is because the cationic surfactant, the silica precursor, and the ceria precursor may be sequentially dissolved as described so that the cationic surfactant, the silica precursor, and the ceria precursor may be sufficiently dissolved.

The cationic surfactant is added to a mesoporous silica template in order to form a pore. The cationic surfactant, which severs as a cationic surfactant ($CH_3(CH_2)_nN^+(CH_3)_3$) including hydrophobic alkyl chain and hydrophilic amine, may include hexadecyl trimethyl ammonium bromide (CTAB) or hexadecyl trimethyl ammonium chloride (CTACl). The cerium precursor may include one selected from the group consisting of cerium hydroxide ($Ce(OH)_4$), cerium nitrate ($Ce(NO_3)_3$), and cerium sulfate ($Ce_2(SO_4)_3$, $Ce(SO_4)_2$), and the silica precursor may include tetraethyl orthosilicate (TEOS) or tetramethyl orthosilicate (TMOS).

In addition, according to the method of preparing the mesoporous silica/ceria-silica composite of the present invention, the mole ratio of the cerium, precursor to the silica precursor is in the range of 0.001-0.5. If the mole ratio is less than 0.001, a free radical scavenging effect and catalytic activity may be significantly degraded. If the mole ratio exceeds 0.5, cerium particles may be agglomerated, or the strength of a silica template may be degraded.

The stirring is preferably performed at a rate of 200-600 rpm for 30-1440 min. If the stirring rate is less than 200 rpm, a nano-structure may not be uniformly formed. Accordingly, it is preferred that the stirring rate is 600 rpm or less when considering the shape of a reactor and reaction stability. The reason for time limitation has been described above.

The method of preparing the mesoporous silica/ceria-silica composite according to the present invention includes a step of preparing the mesoporous silica/ceria-silica composite by calcining the mixed solution after making a hydrothermal reaction for the mixed solution (S200).

In this case, preferably, the hydrothermal reaction is performed at the temperature of 80-120° C. for 20-48 hours. If the hydrothermal reaction is made at the temperature of less than 80° C., the bonding strength between silica and ceria may be weakened, and the bonding strength among silica particles may be weakened. If the hydrothermal reaction is made at the temperature of 120° C. for more than 48 hours, not only the bonding between the silica and the ceria, but also the bonding between silica particles may be decomposed.

In addition, preferably, the calcining is performed under air at the temperature of 500-600° C. for 4-6 hours. If the calcination is performed at the temperature of less than 500° C., the cationic surfactant is not removed, so that the mesoporous composite structure may not be prepared. If the calcination is performed at more than 600° C., the surfactant may be sufficiently removed. Accordingly, the calcimining temperature is 600° C. or more in terms of energy efficiencies.

The method of preparing the mesoporous silica/ceria-silica composite according to the present invention includes a step of reducing the prepared mesoporous silica/ceria-silica composite (S300).

The reducing is preferably performed at the temperature of 850-900° C. for 3-6 hours. If the reducing is performed at the temperature of less than 850° C., an oxidation state of $Ce^{4+}$ may not be reduced into $Ce^{3+}$. If the reducing is performed at the temperature of more than 900° C., the bonding between silica and ceria may be decomposed, so that the nano-structure may not be maintained. The reason for the reduction time limitation is the same as the reason for the temperature limitation.

Further, in reduction, mixture gas including 5-10 volume % of nitrogen gas based on hydrogen gas may be used. If the nitrogen gas is contained in less than 5 volume %, the composite may not be smoothly reduced, so that the oxidation state of cerium may not be changed. If the nitrogen gas is contained in more than 10 volume %, explosion hazard may be increased due to an excessive amount of nitrogen gas.

MODE FOR INVENTION

Embodiment 1: Preparation 1 of Hexagonal Mesoporous Silica/Ceria-Silica Composite In Embodiment 1, 1.5 g of hexadecyl trimethyl ammonium bromide (4.1 mmol) was stirred in 30 ml of deionized water, 35 ml of $NH_4OH$, and 45.6 ml of ethanol and completely dissolved. After stirring the mixing solution in a 125 ml glass container at a normal temperature for 30 min. using a magnetic bar, and 3 ml TEOS was added into the mixing solution. After stirring the mixing solution at a constant rate of 500 rpm for 30 min., 1.4 g of cerium hydroxide was added, and the mixture of the mixing solution and the cerium hydroxide was stirred at the normal temperature for 20 hours, and the mixture was subject to the hydrothermal reaction the temperature 100° C. for 24 hours in a convection oven. The mixture was filtered using a sufficient amount of deionized water to remove a surfactant, a solvent, and an unreacted material, and calcined at the temperature of 550° C. for 5 hours under the atmospheric atmosphere. In the calcination, heating was performed at the rate of 3° C./min from the normal temperature to 550° C.

The heating was performed from the normal temperature to 850° C. at an average heating rate of 4.5° C./min after the calcination process. Then, the heating was constantly performed at 850° C. for five hours to reduce the mesoporous silica/ceria-silica composite. In this case, the total flow rate was 205 ml/min under the flow of 7 volume % of hydrogen diluted with nitrogen.

Embodiment 2: Preparation 2 of Hexagonal Mesoporous Silica/Ceria-Silica Composite In Embodiment 2, the hexagonal mesoporous silica/ceria-silica composite was prepared in the same manner as that of Embodiment 1 except that the cerium hydroxide was added so that the mole ratio of cerium hydroxide to TEOS was 0.4.

Embodiment 3: Preparation 3 of Hexagonal Mesoporous Silica/Ceria-Silica Composite In Embodiment 3, the hexagonal mesoporous silica/ceria-silica composite was prepared in the same manner as that of Embodiment 1 except that cerium hydroxide was added so that the mole ratio of cerium hydroxide to TEOS was 0.3.

Embodiment 4: Preparation 4 of Hexagonal Mesoporous Silica/Ceria-Silica Composite In Embodiment 4, the hexagonal mesoporous silica/ceria-silica composite was prepared in the same manner as that of Embodiment 1 except that cerium hydroxide was added so that the mole ratio of cerium hydroxide to TEOS was 0.2.

Embodiment 5: Preparation 1 of Cubic Mesoporous Silica/Ceria-Silica Composite

In Embodiment 5, 1.2 g of hexadecyl trimethyl ammonium bromide (3.3 mmol) was stirred in 50 ml of deionized water, 6 ml of $NH_4OH$, and 25 ml of ethanol and completely dissolved. After stirring the mixing solution in a 125 ml glass container at a normal temperature for 30 min. using a magnetic bar, 3 ml TEOS was added to the mixing solution. After stirring the mixing solution at a constant rate of 500 rpm for 30 min., 1.4 g of cerium hydroxide was added, the mixture of the mixing solution and the cerium hydroxide was stirred at the normal temperature for 20 hours, and the mixture was subject to the hydrothermal reaction at the temperature 100° C. for 24 hours in a convection oven. The mixture was filtered using a sufficient amount of deionized water to remove a surfactant, a solvent, and an unreacted material, and calcined at the temperature of 550° C. for 5 hours under the atmospheric atmosphere. In the calcination, heating was performed at the rate of 3° C./min from the normal temperature to 550° C. The heating was performed from the normal temperature to 850° C. at an average heating rate of 4.5° C./min after the calcination process. Then, the heating was constantly performed at 850° C. for five hours to reduce the mesoporous silica/ceria-silica composite. In this case, the total flow rate was 205 ml/min under the flow of 7 volume % of hydrogen diluted with nitrogen.

Embodiment 6: Preparation 2 of Cubic Mesoporous Silica/Ceria-Silica Composite

In Embodiment 6, the cubic mesoporous silica/ceria-silica composite was prepared in the same manner as that of Embodiment 5 except that cerium hydroxide was added so that the mole ratio of cerium hydroxide to TEOS was 0.4.

Embodiment 7: Preparation 3 of Cubic Mesoporous Silica/Ceria-Silica Composite

In Embodiment 7, the cubic mesoporous silica/ceria-silica composite was prepared in the same manner as that of Embodiment 5 except that cerium hydroxide was added so that the mole ratio of cerium hydroxide to TEOS was 0.3.

Embodiment 8: Preparation 4 of Cubic Mesoporous Silica/Ceria-Silica Composite

In Embodiment 8, the cubic mesoporous silica/ceria-silica composite was prepared in the same manner as that of Embodiment 5 except that cerium hydroxide was added so that the mole ratio of cerium hydroxide to TEOS was 0.2.

Experimental Example 1: Analysis of Surface and Shape of Mesoporous Silica/Ceria-Silica Composite The surface and the shape of the mesoporous silica/ceria-silica composite according to the present invention were analyzed by an FE-SEM and a TEM, and the analysis results are shown in FIGS. 2, 3, 4, and 5.

As shown in FIG. 2(a), the mesoporous silica/ceria-silica composite according to the present invention (before the reduction process in Embodiment 4) is in the shape of a sphere having a diameter of about 500 nm, and the composites other than that of Embodiment 4 is in the shape of a sphere having a nano-size diameter. In addition, a large amount of nano-size particles in size smaller than those of the spherical particles was mixed with the spherical particles. FIG. 2(b) is a TEM photograph of Embodiment 1. The nano-size particles in size smaller than those of the spherical particles was appeared as being in a dark dot shape, and as being scattered among spherical particles linked to each other.

FIGS. 3(a) to 3(c) are high-magnification TEM photographs to analyze the nano-structure particles and the size thereof. As shown in FIGS. 3(a) to 3(c), the spherical particles of the composites, which are prepared before the reduction process performed according to Embodiments 1 and 4, contain hexagonal and cubic porous structures having high regularity, and a large amount of aspherical particles are scattered therebetween.

FIGS. 4(a) and 4(b) are TEM photographs showing the mesoporous silica/ceria-silica composite powders according to the present invention. As shown in FIG. 4(b), a large amount of aspherical particles are not shown in a uniform porous structure.

FIGS. 5(a) and 5(b) are graphs showing the analysis results by a TEM EDX in order to examine the chemical composites of mutually different particles. FIG. 5(a) shows the spherical particles, and FIG. 5(b) shows the aspherical particles. As shown in FIG. 5(a), silica particles contain 50.0% of Si, 49.5% of O, and 0.5% of Ce in weight %, and the aspherical particles contain 18.9% of silicon, 25.5% of oxygen, and 55.6% of cerium. Accordingly, the mesoporous silica/ceria-silica composite according to the present invention contains mesoporous silica particles having high regularity and a small amount of cerium, and aspherical nano-particles having a large amount of cerium.

Experimental Example 2: Analysis of Surface and Shape of Mesoporous Silica/Ceria-Silica Composite The surface and the shape of the mesoporous silica/ceria-silica composite according to the present invention are analyzed through a small angle X-ray scattering (SAXS), a nitrogen adsorption-desorption isothermal curve, a pore size distribution curve, X-ray diffraction, scattering and reflection of ultraviolet-visible absorbance spectrum measurement, and X-ray photoelectron (XPS), and the analysis results are shown in FIGS. 6, 7, 8, 9, and 10.

FIG. 6 is a graph showing the analysis result of the surface and the shape of the nano-structure of the mesoporous silica/ceria-silica composite according to the present invention by the small angle X-ray scattering (SAXS). As shown in FIG. 6, in the mesoporous silica/ceria-silica composite, all Ce-doped silica have 2-D hexagonal (p6mm) mesostructures having three peaks indexed with (100), (110), and (200) according to p6mm symmetric groups, and have high regularity. The d-spacing ($d_{100}$) obtained from the Bragg peak having the greatest strength is slightly reduced to a value in the range of 3.905 nm to 3.820 nm. It can be understood that the crystal lattice parameter is in the range of 4.41-4.51 nm which is calculated based on $2d_{100}/\sqrt{3}$ from each d-spacing. In FIG. 6, a curve (a) represents a silica particle contained in the mesoporous silica/ceria-silica composite prepared when the mole ratio of Ce(OH)$_4$/TEOS is 0.1, and recognized as being in a hexagonal lattice structure based on the peak intensity. A curve (b) represents a composite prepared in Embodiment 4 before the reduction process is performed, and curves (c), (d), and (e) represent composites prepared according to Embodiments 3, 2, and 1, respectively.

FIGS. 7(a) and 7(b) are graphs showing a nitrogen adsorption-desorption isothermal curve of the hexagonal mesoporous silica/ceria-silica composite according to the present invention, and the pore size distribution of the composite, respectively. In detail, FIG. 7(a) shows the nitrogen adsorption-desorption isothermal cure e, and FIG. 7(b) is a graph showing the pore size distribution. In FIG. 7, reference codes A, B, C, and D represent curves of hexagonal mesoporous silica/ceria-silica composites before the reduction process is performed, which are prepared in Embodiments 4, 3, 2, and 1. All isothermal curves are IV-type curves related to a capillary action of a mesopore under relative pressures (P/P$_0$) ranging 0.24 to 0.32, which represents capillary condensation of nitrogen in a channel forming the hexagonal mesostructure. The capillary condensation is maintained even when cerium is contained in high content, which represents that high regularity is preserved in porous channels of Ce-doped silica particles existing in the hexagonal mesoporous silica/ceria-silica composite. A BET specific surface area of the hexagonal mesoporous silica/ceria-silica composite was in the range of 370 to 560 m$^2$/g, and the total porous volume (V$_t$) was in the range of 0.42 to 0.52 cm$^3$/g. Regarding the pore size calculated through the KJS manner, as shown in FIG. 7(b), the pore size distribution of all mesoporous silica ceria-silica composites having the hexagonal structures was significantly narrow. In the graph showing the pore size distribution, the pore diameter obtained at the peak value was in the range of 3.3 to 3.4, and the wall thickness (a–D$_{KJS}$) value was in the range of about 1.1-1.2 nm.

FIGS. 8(a) to 8(d) are graphs showing X-ray diffraction patterns of the hexagonal mesoporous silica/ceria-silica composites according to the present invention, in detail, graphs showing the X-ray diffraction patterns of the mesoporous silica/ceria-silica composites before the reduction process is performed, which are prepared according to Embodiments 4, 3, 2, and 1. As shown in FIGS. 8(a) to 8(d), the composite prepared according to Embodiment 4 shows the complex shape of amorphous silica) (2θ=22°) and ceria. As the content of ceria is increased, a specific peak representing silica is reduced (expressed in an arrow of FIGS. 8(a) to 8(d)), and five/sixth diffraction peaks represent that the ceria has a typical face centered cubic lattice. The lattice constant of the cubic shape ceria is estimated to a=b=c=0.5434-0.5526 nm based on a (200) peak, and slightly greater than 0.5411 nm which is a lattice constant of CeO$_2$ having a bulk shape.

The increased lattice constant for the ceria-silica particle is related to the formation of the defect of silica contained in a ceria lattice. The crystal size was measured to a value in the range of 1.5-1.8 nm by applying a Scherrer equation (L=Kλ/β cos θ) based on the full width at half maximum (FWHM) of a (111) diffraction peak. The ratio of A$_{(111)}$/A$_{(200)}$ provides information on the possibility of an appropriate orientation of a ceria crystal surface. Since a (200) plane represents a tendency of an oxygen air gap higher than that of a (111) plane as generally known in the art, the information on the ratio of Ce$^{4+}$/Ce$^{3+}$ may be provided. The ratio is a value in the range of 3.2-3.6, and slightly increased according to the content of cerium.

FIG. 9 is a graph showing scattering and reflection ultraviolet-visible absorbance spectra of the hexagonal mesoporous silica/ceria-silica composite according to the present invention, and (a), (b), (c), and (d) of FIG. 9 are curves representing the composites prepared before the reduction process is performed according to Embodiments 4, 3, 2, and 1. As shown in FIG. 9, ceria is a semiconductor having a wide bandgap and has an ultraviolet suppression characteristic. In addition, the composite resulting from the silica is analyzed by the absorption of the ultraviolet light-visible light. In the mesoporous silica/ceria-silica composite according to the present invention, the absorbance is appeared in the wide range of 250-440 nm (2.82 eV), and the maximum absorbance peak is appeared at about 320 nm (3.87 eV).

FIGS. 10(a) to 10(d) are graphs showing X-ray photoelectron (XPS) measurement results of the hexagonal mesoporous silica/ceria-silica composite according to the present invention. FIGS. 10(a) to 10(d) show the composites prepared before the reduction process is performed according to Embodiments 4, 3, 2, and 1, respectively. XPS measurement was performed to examine the oxidation state of cerium on the surface of the mesoporous silica/ceria-silica composite. In each spectrum of 3d of Ce, eight separate peaks are shown through a Gaussian fitting manner. In FIG. 10, a series of v and u peaks are shown from 3d$_{5/2}$ and 3d$_{3/2}$ orbitals of Ce, respectively, in which v$_1$ and u$_1$ peaks correspond to Ce$^{3+}$, and remaining peaks correspond to Ce$^{4+}$.

Following table 1 shows the mole ratios of cerium hydroxide to tetraethyl orthosilicate, Ce contents, Ce molar masses, % of Ce/Si, BET specific surface areas, total pore volumes, and pore diameters in the hexagonal and cubic mesoporous silica/ceria-silica composites prepared before the reduction process is performed according to embodiments 1 to 8 of the present invention.

TABLE 1

|  | Mole ratio (Ce/Si) | Ce content (wt %) | Ce molar mass (mmol/g) | Ce/Si (%) | BET specific surface area (m$^2$/g) | Pore volume (cm$^3$/g) | Pore diameter (nm) |
| --- | --- | --- | --- | --- | --- | --- | --- |
| Embodiment 1 | 0.5 | 43.52 | 3.106 | 50.6 | 370 | 0.42 | 3.4 |
| Embodiment 2 | 0.4 | 41.41 | 2.955 | 46.4 | 390 | 0.44 | 3.3 |
| Embodiment 3 | 0.3 | 30.53 | 2.179 | 28.9 | 447 | 0.46 | 3.3 |
| Embodiment 4 | 0.2 | 24.84 | 1.773 | 21.7 | 560 | 0.52 | 3.3 |
| Embodiment 5 | 0.5 | — | — | — | 356 | 0.42 | 3.4 |
| Embodiment 6 | 0.4 | — | — | — | 455 | 0.50 | 3.4 |
| Embodiment 7 | 0.3 | — | — | — | 543 | 0.56 | 3.5 |
| Embodiment 8 | 0.2 | — | — | — | 637 | 0.64 | 3.4 |

As recognized from the results, the oxidation state of the ceria is mainly $Ce^{4+}(CeO_2)$, which represents that the total cerium content reaches 80% to 90% in the composite. Since $Ce^{3+}(Ce_2O_3)$ has high reactivity and high performance as a radical scavenger, the reduction process is performed to increase the content of $C^{3+}$ in the composite.

Following table 2 shows the binding energies of the hexagonal mesoporous silica/ceria-silica composites prepared before the reduction process is performed according to Embodiments 1 to 4 of the present invention and integrated region ratios of peaks of the silica/ceria-silica composites.

TABLE 2

| | | XPS | | | | | | | |
|---|---|---|---|---|---|---|---|---|---|
| | | Ce $3d_{5/2}$ | | | | Ce $3d_{3/2}$ | | | |
| Embodiment | Peak allocation | $v_0$ $Ce^{4+}$ | $v_1$ $Ce^{3+}$ | $v_2$ $Ce^{4+}$ | $v_3$ $Ce^{4+}$ | $\mu_0$ $Ce^{4+}$ | $\mu_1$ $Ce^{3+}$ | $\mu_2$ $Ce^{4+}$ | $\mu_3$ $Ce^{4+}$ |
| Embodiment 4 | Binding energy (eV) | 884.3 | 886.5 | 890.9 | 900.4 | 902.8 | 904.3 | 909.1 | 919.0 |
| | Peak region (%) | 10.7 | 11.0 | 14.5 | 15.9 | 7.1 | 5.9 | 18.9 | 16.0 |
| Embodiment 3 | Binding energy (eV) | 883.6 | 886.2 | 889.8 | 899.3 | 901.9 | 903.8 | 909.3 | 918.8 |
| | Peak region (%) | 9.0 | 8.8 | 18.3 | 10.0 | 8.4 | 15.0 | 13.4 | 17.1 |
| Embodiment 2 | Binding energy (eV) | 883.9 | 886.1 | 890.2 | 899.6 | 902.2 | 904.5 | 909.7 | 918.6 |
| | Peak region (%) | 10.1 | 10.9 | 15.5 | 8.9 | 11.3 | 11.7 | 14.5 | 17.1 |
| Embodiment 1 | Binding energy (eV) | 884.5 | 887.0 | 889.0 | 900.2 | 902.9 | 905.6 | 909.9 | 919.3 |
| | Peak region (%) | 7.2 | 2.3 | 29.3 | 10.5 | 12.3 | 7.9 | 14.4 | 16.1 |

As shown in table 2, the ratios of $Ce^3$ to the total contents of the cerium are represented as 10.2 mol % in Embodiment 1, 22.6 mol % in Embodiment 2, 23.8 mol % in Embodiment 3, and 16.9 mol % in Embodiment 4, respectively.

Experimental Example 3: Analysis of Surface and Shape of Silica/Ceria-Silica Composite Before Reduction Process is Performed In order to examine the shape and the surface of the silica/ceria-silica composite after the reduction process is performed according to the present invention, the shape and the surface of the silica/ceria-silica composite are analyzed by the SAXS spectrum, a nitrogen adsorption-desorption isothermal curve, a pore size distribution of the composite, and a wide angle X-ray diffraction pattern, and the analysis results are shown in FIGS. 11 to 13.

FIG. 11 is a graph showing an SAXS spectrum of the reduced silica/ceria-silica composite according to the present invention. In FIG. 11, reference code (a) represents a silica/ceria-silica composite prepared according to Embodiment 1, and reference code (b) represents a silica/ceria-silica composite prepared according to Embodiment 2. As shown in FIG. 11, 2-D hexagonal and 3-D cubic mesostructure silica particles having high regularity in the reduced composite maintain the SAXS spectrum of the composite before the reduction process is performed. In FIG. 11, reference number (a) may represent (100), (110) and (200) of a p6mm symmetry group. In addition, d-spacing ($d_{100}$) and a unit lattice parameter are obtained as 3.588 nm and 4.14 nm, respectively, which are smaller than 3.820 nm and 4.41 nm of the composite before the reduction process is performed. In FIG. 11, reference number (b) may represent (211), (220), (321), (400), (420), (332), (422) and (431) reflections, which correspond to a double continuity cubic (Ia3d) mesostructure. In addition, d-spacing ($d_{211}$) and a unit lattice parameter are obtained as 3.331 nm and 8.16 nm, respectively, which are smaller than 3.672 nm and 9.00 nm of the composite before the reduction process is performed. Due to the reduction process, the composites of Embodiments and 5 are shrunken in structure by 6.11 and 9.3, respectively.

FIGS. 12(a) and 12(b) are graphs showing nitrogen adsorption-desorption isothermal curves of the reduced hexagonal and cubic silica/ceria-silica composites according to the present invention, and the pore size distribution of the composite, respectively. In detail, FIG. 12(a) is a graph showing the nitrogen adsorption-desorption isothermal curve, and FIG. 12(b) is a graph showing the pore size distribution. In FIGS. 12(a) and 12(b), reference numbers A and B are curves showing the reduced mesoporous silica/ceria-silica composites prepared according to Embodiments 1 and 5, respectively. All isothermal curves are IV-type curves related to the capillary condensation of mesopores. The range of relative pressure (P/P$_0$) for the capillary condensation is reduced by 0.02 as compared with that of the composite before the reduction process is performed. Although a hysteresis phenomenon is not observed in the isothermal curve of the hexagonal composite, the slight hysteresis phenomenon is appeared in the isothermal curve of the cubic composite under the relative pressure of 0.4 to 1.0. In addition, as recognized from FIG. 12(b), all reduced composites show narrow pore size distribution. In the reduced hexagonal composite, the BET specific surface area is 264 m$^2$/g, the total pore volume is 0.29 cm$^3$/g, and the pore diameter is 3.0 nm. In the reduced cubic composite, the BET specific surface area, the total pore volume, and the pore diameter are 287 m$^2$/g, 0.28 cm$^3$/g, and 2.9 nm, respectively. As shown in the nitrogen adsorption analysis, the porosity and the pore size are reduced due to the reduction process at the high temperature except for the wall thickness of 1.1-1.2 nm.

Following table 3 shows the mole ratios of cerium hydroxide to tetraethyl orthosilicate, Ce contents, Ce molar masses, % of Ce/Si, BET specific surface areas, total pore volumes, and pore diameters in the reduced hexagonal and cubic mesoporous silica/ceria-silica composites.

TABLE 3

| Embodiments | Mole ratio (Ce/Si) | Ce content (wt %) | Ce molar mass (mmol/g) | Ce/Si (%) | BET specific surface area (m²/g) | Pore volume (cm³/g) | Pore diameter (nm) |
|---|---|---|---|---|---|---|---|
| Embodiment 1 | 0.5 | 45.29 | 3.232 | 54.4 | 264 | 0.29 | 3.0 |
| Embodiment 5 | 0.5 | 45.82 | 3.270 | 55.6 | 287 | 0.28 | 2.9 |

FIGS. 13(a) and 13(b) are graphs showing wide angle X-ray diffraction patterns of the reduced hexagonal and cubic mesoporous silica/ceria-silica composites according to the present invention, and, in detail, showing composites according to Embodiments 1 and 5 subject to the reduction process. As shown in FIGS. 13(a) and 13(b), two diffraction patterns are substantially identical to each other. However, the two diffraction patterns are not identical to a pattern of a typical cubic cerium dioxide, which represents that a new crystal phase is not created. The diffraction patterns are matched with that of $Ce_{4.667}Si_3O_{13}$ in a structure similar to an apatite structure having a hexagonal unit lattice, which represents that an amount of $CeO_2$ in the reduced mesoporous silica/ceria-silica composite is negligible, and almost parts of Ce in the composite is oxidized to $Ce^{3-}$. The amounts of Ce in the reduced hexagonal and cubic mesoporous silica/ceria-silica composites are 3.232 mmol/g and 3.270 mmol/g, respectively, which are substantially identical to those in the composites before the reduction process is performed.

Although detailed embodiments of the mesoporous silica/ceria-silica composite according to the present invention and the method of preparing the same have been described, those skilled in the art will appreciate that various modifications, additions and substitutions are possible, without departing from the scope and spirit of the invention as disclosed in the accompanying claims.

Therefore, those skilled in the art should define the scope of the present invention by accompanying claims and equivalents thereof without the limitation to the embodiments described above.

In other words, the above-described embodiments are provided for illustrative purposes, and the scope of the present invention is defined by the claims instead of the detailed description. In addition, those skilled in the art should understand that all variations and modifications derived from the meaning and the scope of the claims, and the equivalents of the claims fall within the scope of the present invention.

The invention claimed is:

1. A mesoporous silica/ceria-silica composite comprising a mesoporous silica having a hexagonal structure or a cubic structure and a ceria having the hexagonal structure and provided on a surface and in a pore of the mesoporous silica, wherein oxidation states of the ceria are $Ce^{4+}$ and $Ce^{3+}$,
   wherein, in the oxidation states of the ceria, the $Ce^{3+}$ has a content of 10.2 mole % to 23.8 mole % based on a total cerium, and the $Ce^{4+}$ has a content of 76.2 mole % to 89.8 mole % based on the total cerium.

2. The mesoporous silica/ceria-silica composite of claim 1, wherein a mole ratio of Ce of the ceria to Si of the silica is in a range of 0.001 to 0.5.

3. The mesoporous silica/ceria-silica composite of claim 1, wherein the mesoporous silica has a pore volume of 0.20 cm³/g to 0.40 cm³/g.

4. The mesoporous silica/ceria-silica composite of claim 1, wherein the mesoporous silica/ceria-silica composite has a BET specific surface area of 250 m²/g to 600 m²/g.

5. A method of preparing a mesoporous silica/ceria-silica composite, the method comprising:
   mixing and stirring a cationic surfactant, a silica precursor, and a cerium precursor;
   preparing the mesoporous silica/ceria-silica composite by calcining a mixed solution after performing a hydrothermal reaction for the mixed solution; and
   reducing the prepared mesoporous silica/ceria-silica composite,
   wherein the reducing is performed at a temperature of 850° C. to 900° C. for 3 hours to 6 hours,
   wherein a structure of mesoporous silica/ceria-silica composite is stable while the reducing is performed.

6. The method of claim 5, wherein the cationic surfactant includes hexadecyl trimethyl ammonium bromide (CTAB) or hexadecyl trimethyl ammonium chloride (CTACl).

7. The method of claim 5, wherein the silica precursor includes tetraethyl orthosilicate (TEOS) or tetramethyl orthosilicate (TMOS).

8. The method of claim 5, wherein the cerium precursor includes one selected from the group consisting of cerium hydroxide ($Ce(OH)_4$), cerium nitrate ($Ce(NO_3)_3$), and cerium sulfate ($Ce_2(SO_4)_3$, $Ce(SO_4)_2$).

9. The method of claim 5, wherein a mole ratio of the cerium precursor to the silica precursor is in a range of 0.001 to 0.5.

10. The method of claim 5, wherein the stirring is performed at a rate of 200 rpm to 600 rpm for 30 min. to 1440 min.

11. The method of claim 5, wherein the hydrothermal reaction is performed at a temperature of 80° C. to 120° C. for 20 hours to 48 hours.

12. The method of claim 5, wherein the calcining is performed under air at a temperature of 500° C. to 600° C. for 4 hours to 6 hours.

13. A mesoporous silica/ceria-silica composite comprising a mesoporous silica having a hexagonal structure or a cubic structure and a ceria having the hexagonal structure and provided on a surface and in a pore of the mesoporous silica,
   wherein the ceria is reduced through heat treatment and the ceria is present in oxidation states of $Ce^{3+}$, and
   wherein the ceria has diffraction patterns which are matched with that of $Ce_{4.667}Si_3O_{13}$ in a structure similar to an apatite structure having a hexagonal unit lattice.

14. The mesoporous silica/ceria-silica composite of claim 13, wherein the $Ce^{3+}$ has a content of 10.2 to 100 mole % based on a total cerium.

* * * * *